Figure 1:
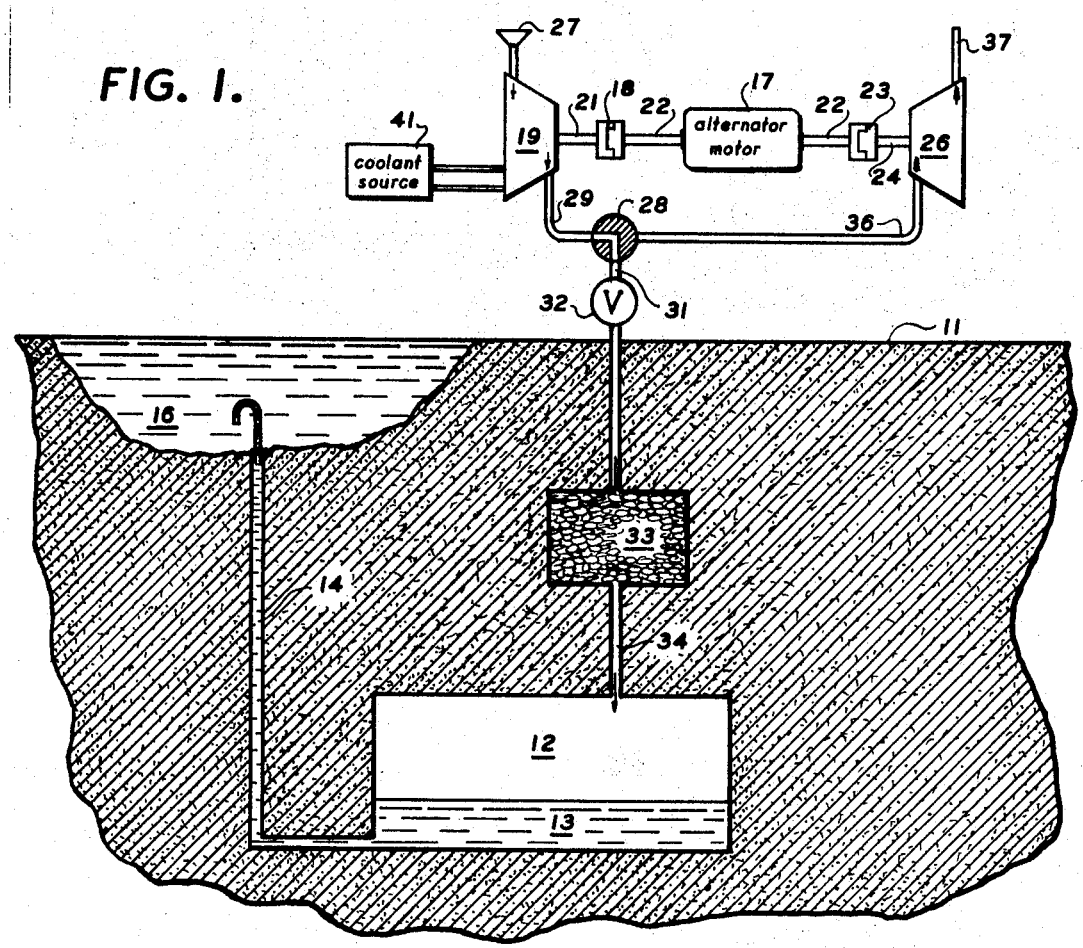

United States Patent
Koutz

[15] 3,677,008
[45] July 18, 1972

[54] ENERGY STORAGE SYSTEM AND METHOD
[72] Inventor: Stanley L. Koutz, San Diego, Calif.
[73] Assignee: Gulf Oil Corporation, Pittsburgh, Pa.
[22] Filed: Feb. 12, 1971
[21] Appl. No.: 115,017

[52] U.S. Cl............................................................60/59 T
[51] Int. Cl.......................................................F01k 27/00
[58] Field of Search...................60/59 T, 59 R, 57 T, 56, 55, 60/26

[56] References Cited

UNITED STATES PATENTS 1,231,051  6/1917  Nordberg........................60/59 R UX
1,297,363  3/1919  Kneedler................................60/59 R
2,268,074  12/1941  Keller......................................60/59 T
2,621,481  12/1952  Bowden..................................60/59 T

*Primary Examiner*—Edgar W. Geoghegan
*Attorney*—Anderson, Luedeka, Fitch, Even and Tabin

[57] ABSTRACT

A method and system are described for using compressed air for storing and utilizing energy. Air is compressed and stored and the heat of compression is removed from the air prior to storage. The air is subsequently removed from storage and the stored heat is restored to the air prior to expansion of the air for deriving work.

11 Claims, 2 Drawing Figures

PATENTED JUL 18 1972 3,677,008

INVENTOR.
STANLEY L. KOUTZ
BY
Anderson, Luedeka, Fitch, Even, & Tabin
ATTORNEYS

ENERGY STORAGE SYSTEM AND METHOD

This invention relates to systems for the storage and use of energy and, more particularly, to a method and system of using compressed air for storing and utilizing energy.

Because the demand for electrical power may vary considerably from time to time, many public utilities have been searching for a means of storing large amounts of energy. By doing so, excess energy available during periods of low demand can be produced and stored until such energy is needed during periods of high demand. In this way, main power plant facilities can be designed to produce electrical energy on a relatively constant basis, reducing their complexity and costs.

One means of providing for large-scale energy storage is to utilize excess electrical energy during off-peak periods to pump water to a higher level where it is stored in a suitable reservoir. The stored potential energy in the water is subsequently utilized to drive hydroelectric facilities during peak power need periods so that additional generators can be cut into the line. Such systems have the disadvantage that they require suitable geographical features, substantial surface area, and are difficult and expensive to build.

An alternative means of energy storage which offers significant advantages over the hydroelectric pumped storage, discussed above, is the utilization of compressed air for energy storage. Typically such a system involves the storage of compressed air in an excavated or natural cavern which is hydrostatically pressurized from a suitable water reservoir or is otherwise pressurized. Excess electrical power is used to operate compressors which compress the air for storage during periods of low electrical demand. The stored compressed air is then removed during periods of high demand to drive turbines for operating additional electrical generation equipment during periods of high demand. Such systems have been described in articles in the published periodic journals Business Week, Aug. 1, 1970, page 74; and Mechanical Engineering, Nov. 1970, page 20.

Known compressed air storage systems, although providing significant promise for the purpose intended, typically require that essentially all of the heat of compression be discharged to air or cooling water in order to increase the mount of air stored in a given cavity volume. When the air is utilized for power production, it must be reheated by addition of energy, e.g. by burning fossil fuel. The heat thus required involves additional energy input which may reduce the overall efficiency and economy of the power plant.

Accordingly, it is an object of the present invention to provide an improved method and system of using compressed air for storing and utilizing energy.

Another object of the invention is to provide a method and system for using compressed air for storing and utilizing energy in which efficiency is substantially improved.

It is another object of the invention to provide a method and system of using compressed air for storing and utilizing energy in which the amount of fuel which must be burned is substantially reduced or eliminated.

Figure 2:
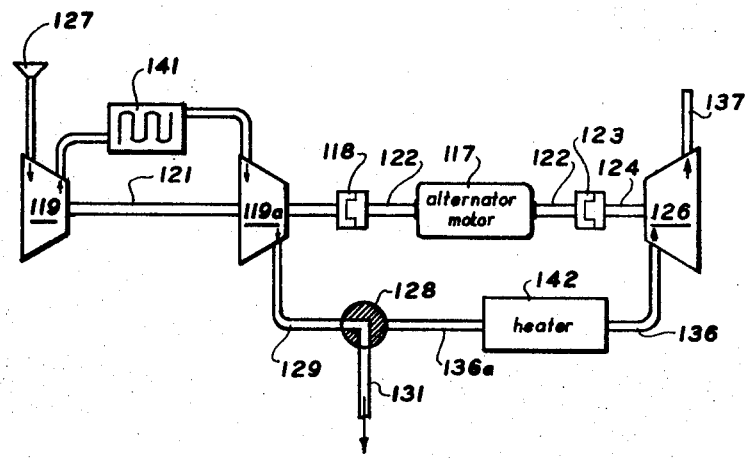

Other objects of the invention will become apparent to those skilled in the art from the following description, taken in connection with the accompanying drawings wherein:

FIG. 1 is a schematic diagram illustrating a system constructed in accordance with the invention for employing the method of the invention; and FIG. 2 is a partial schematic diagram illustrating a modification of the system of FIG. 1.

Very generally, the method and system of the invention involve the compression of a quantity of air and the storing of same in a suitable reservoir. A substantial amount of the heat of compression of the air is removed prior to storage of the air and such removed heat is also stored. Upon demand, at least part of the stored compressed air is removed and a substantial amount of the stored heat of compression is restored to heat the removed compressed air. Work is thereafter derived from the heated compressed air by allowing it to expand.

The method of the invention may best be understood by reference to the drawings in which a system constructed in accordance with the invention is illustrated. In FIG. 1, ground level is indicated at 11. The below ground components of the system include a storage chamber or reservoir 12 which is partially filled with water 13 to maintain a suitable hydrostatic pressure through an aqueduct 14 communicating with a surface reservoir 16.

The mechanical aspects of the system of the invention which are positioned above ground include an alternator/motor 17 which is connected by a clutch 18 to a compressor 19. The compressor 19 is illustrated as a single stage compressor in the drawings, but it is to be understood that the compressor 19 may be a series of compressors or compressor stages, as is known in the art. The clutch 18 couples the compressor drive shaft 21 to the alternator/motor drive shaft 22.

The alternator drive shaft is also coupled through a clutch 23 to the drive shaft 24 of a prime moving means or turbine 26. As was the case in connection with the compressor 19, the turbine 26 is illustrated as a single stage, but it is to be understood that the turbine could comprise a plurality of turbines or turbine stages.

During periods of low demand, the electrical power from the main facility, not illustrated, is used to drive the alternator/motor 17 in the manner of a motor. Under such conditions, the clutch 23 is disengaged and the clutch 18 is engaged so that the alternator/motor 17 drives the compressor 19. Air is drawn into the compressor 19 through the air intake 27 and is passed through a movable valve 28 which couples the outlet duct 29 of the compressor to a duct 31. A releasable valve 32 is provided in the duct 31 and compressed air passes from the compressor 19 through the valve 32 into a regenerator 33. The function and construction of the regenerator will be explained in more detail subsequently in the specification.

After passing through the regenerator 33, the compressed air passes through a duct 34 into the storage chamber or reservoir 12. A suitable hydrostatic pressure is maintained in the chamber 12, as is known in the art, through use of the water reservoir 16 at the surface in order to provide suitable back pressure for the stored compressed air.

During periods of high demand, the alternator/motor 17 is connected into the electrical output system of the main plant, not shown, and driven as an alternator in order to provide an auxiliary power input thereto. Under such conditions, the clutch 18 is disengaged and the clutch 23 is engaged such that the alternator/motor 17 is coupled to be driven by the turbine 26.

In order to operate the turbine 26, the valve 28 is moved from the condition illustrated to a condition wherein the duct 31 communicates with the turbine inlet duct 36. The valve 32 is released so that the compressed air stored in the reservoir 12 may pass through the duct 34, the regenerator 33, the valve 32, the duct 31, the valve 28, the duct 36 and into the turbine 26. The compressed air then drives the turbine 26 as it expands to atmosphere and issues through an outlet duct 37.

As previously mentioned, the air, on its way to storage in the reservoir 12, passes through the regenerator 33. During compression in the compressor 19, the temperature of the air will rise. In many systems, the work which the compressor must perform is reduced by providing intercooling stages and the volume required to store the air is reduced by providing an after-cooler stage. Such stages require separate provision for cooling and therefore increase the amount of energy consumed by the overall system.

In accordance with the invention, the air is compressed with no aftercooling so that it is at an elevated temperature due to the heat of compression when it enters the regenerator 33. The heat of compression is thereby removed from the air and stored in the regenerator. The regenerator effectively performs the function of an aftercooler but without wasting the heat. As is the case with an aftercooler, a greater amount of air may be stored for a given size reservoir since cooled air occupies less volume. Also the necessity of utilizing power for separate cooling facilities such as intercoolers and aftercoolers may be entirely avoided. When the air is returned to the system to drive the turbine 26, the air passes through the regenerator 33 and the heat of compression is restored to the air, increasing the available energy for the system.

The regenerator stage 33 is illustrated as an underground cavity filled with crushed rock. Typically, the crushed rock has a 10–25 percent void fraction. Approximate dimensions for a typical system for storing sufficient thermal energy to produce 1,000,000 kilowatts of electrical power for a 10-hour period might employ a reservoir 12 1,400 feet below the surface of the reservoir 16. The reservoir 12 would have a volume of about 1.7 million cubic yards and the regenerator would have a volume of approximately 100,000 cubic yards. Economic calculations for such a system indicate that the operating cost will be several mils per kilowatt cheaper than a system constructed in accordance with the prior art utilizing intercoolers and an aftercooler in the compression stages and no regenerator. In addition, this system eliminates the problems associated with the transport and storage of fuel, and the air pollution problem associated with burning fuel.

The cavity comprising the regenerator should be located at a depth capable of sustaining the expected internal pressure of the regenerator. The pressure typically will be about 600 pounds per square inch. Such a pressure would require a minimum depth of about 700 to 1,000 feet. Selection of the site should consider the availability of suitable rock and it may be desirable to locate the regenerator at a deeper location if rock more suitable for high temperature operation is available at that elevation.

The regenerator could be constructed by preparing the cavity using conventional hard rock mining techniques and by later filling the cavity with crushed rock or with fabricated ceramic material. Alternatively, the cavity could be formed by mining the cavity to about 10 percent of the final desired regenerator volume, filling the cavity with explosive, and detonating the explosive. This would produce a pile of crushed rock which could be suitable for the regenerator. Conventional explosives would typically be adequate, but it is conceivable that some excavation could be accomplished by the use of nuclear explosives.

In most cases, the natural rock formation in which the regenerator cavity is formed will be suitable to seal the cavity against the loss of pressure. In certain locations, however, it may be necessary to grout the cavity walls to minimize leakage. In some cases, it may be desirable to provide thermal insulation surrounding the regenerator cavity, such as the utilization of fire brick or other type of ceramic insulation. Similar thermal insulation may be desirable in the duct connecting to the surface.

Although an underground regenerator is shown and described herein, it may be possible to construct a regenerator located above ground level. In such a case, the regenerator would require a suitable pressure vessel designed to withstand the regenerator pressures, typically about 600 pounds per square inch, and the regenerator temperatures, typically approximately 1,200° F. Walls of the pressure vessel may be constructed to withstand high temperatures or suitable thermal insulation may be provided between the structural portions of the walls and the interior of the regenerator. The latter would probably be a more economical solution. The required volume of the regenerator, of the order of 100,000 cubic yards, makes the size of the required pressure vessel for housing the regenerator quite substantial. Accordingly, it is probably more economical to utilize an underground cavity for the regenerator. Some circumstances may make it desirable to utilize a single underground cavity for both the storage reservoir 12 and the regenerator 33. If such is desired, a concrete wall may be constructed within a single cavity to separate the sections utilized for storage from the sections utilized for regeneration.

In the event that peak power requirements still exist after the supply of air has been depleted, it may be necessary to operate the system as a conventional gas turbine, i.e., with turbine 26 driving the compressor 19 and the alternator 17. In such a case, provision (not shown) is made for adding energy in the form of heat to the air which is supplied to the turbine by the compressor. The valve 28 may be modified to bypass the storage chamber and regenerator.

When operating as a conventional gas turbine the alternator output is the difference between the turbine output and the compressor power. In order to produce electricity during this mode of operation some provision is required to prevent the compressor power from exceeding the turbine power. In order to accomplish this, the system of the invention employs a coolant source 41, such as a suitable source of pressurized water, together with an internal water injection system built into the compressor 19. Water injection for the compressor 19 may be designed in accordance with well known techniques used on jet engines, and operates to reduce the work of compression in a manner similar to that achievable by the use of intercoolers. By providing for water injection, preferably at several points in the compressor, the compressor power is less than turbine power and therefore there is sufficient turbine power remaining for the production of electricity. In this mode of operation, the output would probably be approximately one-third that which is achievable when stored air is available. As a result, the system of the invention is provided with additional flexibility in that it is capable of operation as a gas turbine system as well as a stored air system.

It may be desirable under certain circumstances to utilize either an intercooler, a heater, or both in addition to a regenerator. Such a system is illustrated in FIG. 2. The parts of the system of FIG. 2 corresponding to the parts of FIG. 1 have been given identical reference numerals preceded by a 1. The differences are that the compressor 119 is in two stages 119 and 119a and that the air is passed through an intercooler 141 between the two compressor stages. Of course, if more than two compressors or compressor stages are used, several intercoolers may also be desirable. In addition, a heater 142 is inserted in the turbine inlet duct 136–136a.

The heater or burner 142 may be employed if additional preheating of the compressed air prior to expansion in the turbine is desired. In such a case, the consumption of fuel is required, but the required fuel consumption to achieve a given turbine inlet temperature is considerably less than a system in which a regenerator is not employed. The use of a heater together with the regenerator will increase the power output 20 to 30 percent compared to a system with a regenerator but no heater.

The use of an intercooler may also be desirable under certain circumstances. As the amount of intercooling is increased, the work of compression is decreased but the fuel consumption required to achieve a given turbine inlet temperature is increased. For various combinations of off-peak energy cost and fuel cost, the optimum power cost may involve some intercooling.

It may therefore be seen that the invention provides an improved method and system of using compressed air for storing and utilizing energy. The method and system of the invention provide increased efficiency over known prior art methods and systems, making it possible to achieve a higher power output for a given fuel or energy consumption.

Various modifications of the invention in addition to those shown and described herein will become apparent to those skilled in the art from the foregoing description and accompanying drawings. Such modifications are intended to fall within the scope of the appended claims.

What is claimed is:

1. A method of using compressed air for storing and utilizing energy comprising: compressing a quantity of air and storing same, removing a substantial amount of the heat of compression of the air and storing such removed heat, removing at least a part of the stored compressed air, heating the removed compressed air by restoring a substantial amount of the stored heat of compression, and deriving work from the removed and heated compressed air by allowing it to expand.

2. A method according to claim 1 wherein no heat is removed during compression of the air.

3. A method according to claim 1 wherein at least a portion of the heat is removed by intercooling during compression of the air.

4. A method according to claim 1 wherein the removed compressed air is additionally heated after restoration of the stored heat and prior to expansion.

5. A system for using compressed air for storing and utilizing energy comprising: compressor means for compressing a quantity of air, a reservoir for storing the compressed air, a regenerator between said compressor means and said reservoir for removing a substantial amount of the heat of compression of the air passing from said compressor means to said reservoir and for storing such removed heat, prime moving means, means for conducting at least a part of the stored compressed air upon demand from said reservoir to said prime moving means, said conducting means passing the removed compressed air through said regenerator for restoring a substantial amount of the stored heat of compression to the air prior to expansion at said prime moving means.

6. A system according to claim 5 including intercooling means in said compressor means.

7. A system according to claim 5 including a heater for additionally heating the compressed air between said regenerator and said prime moving means.

8. A system according to claim 5 wherein said reservoir comprises an underground cavity, and wherein said regenerator comprises a volume filled with crushed rock.

9. A system according to claim 8 wherein said crushed rock has a 10–25 percent void fraction.

10. A system according to claim 8 wherein said regenerator comprises an underground cavity.

11. A system according to claim 5 including means for cooling said compressor means by water injection to facilitate operation of said system as a conventional gas turbine system.

* * * * *